United States Patent
Young et al.

(10) Patent No.: US 12,166,885 B2
(45) Date of Patent: Dec. 10, 2024

(54) USING NON-FUNGIBLE TOKENS (NFTS) TO SECURELY STORE AND SHARE ENCRYPTED DATA

(71) Applicant: Capital One Services, LLC, McLean, VA (US)

(72) Inventors: Andre Young, Accokeek, MD (US); Clayton Johnson, Edgewood, MD (US); Cara Weikel, Silver Spring, MD (US); Judith Rodriguez, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 315 days.

(21) Appl. No.: 17/815,123

(22) Filed: Jul. 26, 2022

(65) Prior Publication Data

US 2024/0039721 A1    Feb. 1, 2024

(51) Int. Cl.
*H04L 9/32*     (2006.01)
*G06F 21/62*    (2013.01)
*H04L 9/00*     (2022.01)

(52) U.S. Cl.
CPC ........ *H04L 9/3213* (2013.01); *G06F 21/6245* (2013.01); *H04L 9/50* (2022.05)

(58) Field of Classification Search
CPC ...... H04L 9/3213; H04L 9/50; G06F 21/6245
See application file for complete search history.

(56) References Cited

U.S. PATENT DOCUMENTS

| | | | |
|---|---|---|---|
| 11,341,555 B2 * | 5/2022 | Ketchel, III | G06Q 30/0613 |
| 2020/0065464 A1 * | 2/2020 | Dharmarajan | G06F 21/33 |
| 2021/0065267 A1 * | 3/2021 | Smith | G06Q 20/3827 |

* cited by examiner

*Primary Examiner* — Ayoub Alata
(74) *Attorney, Agent, or Firm* — Foley & Lardner LLP

(57) ABSTRACT

Methods and systems are described herein for enabling users to access user data of other users using cryptographic tokens. A data access system may be used to enable access. The system may receive a blockchain operation request for enabling access to first user data associated with a first user. The system may generate a cryptographic token and an access entry. When the system receives a second blockchain operation request for accessing the first user data, the system may determine one or more parameters for accessing the first user data. In response to verifying the one or more parameters, the data access system may enable access to the first user data.

20 Claims, 7 Drawing Sheets

USING NON-FUNGIBLE TOKENS (NFTS) TO SECURELY STORE AND SHARE ENCRYPTED DATA

BACKGROUND

Information sharing is a critical part of daily life. For example, people send all types of communications to each other, and entities provide access to all types of data. However, many types of data cannot be shared with everyone. Accordingly, access permissions are required to access many types of data (e.g., sensitive data, private data, etc.). To ensure that sensitive information, such as healthcare information or medical history, is only shared with appropriate people (e.g., doctors), to access that data users have to be authenticated. Thus, many entities use conventional authentication processes such as passwords, personal identification numbers (PINs), biometric data, etc. Those processes may work well for large institutions or other entities. However, they may not work well for individual users because those users do not possess the resources to maintain servers hosting authentication systems to access data. Accordingly, a mechanism is disclosed that would enable both individuals and institutions to share information without the need to maintain such large infrastructure.

SUMMARY

One mechanism to enable both users and institutions to securely share information may use blockchain technology and, in particular, cryptographic tokens (e.g., non-fungible tokens, also known as NFTs). Therefore, methods and systems are described herein for enabling users or entities (e.g., doctors' offices) to access user data (e.g., healthcare data) of other users (e.g., patients) using cryptographic tokens (e.g., non-fungible tokens) that may store access parameters, such as time parameters, location parameters, etc., that may limit another user's access to the user data. A system may receive a blockchain operation request from a first user's device for enabling a second user access to first user data (e.g., a portion of a user's medical file, medical history, or other suitable data). The blockchain operation request may include a target address associated with a cryptography-based storage application of the second user. In one example, a cryptography-based storage application may store a private key for signing blockchain operations. A cryptographic token (e.g., non-fungible token) and an access entry may be generated that would enable a second user to access the first user data. Once the cryptographic token is generated, the system may receive, from a second device, another blockchain operation request to access the first user data and may determine that the cryptographic token is controlled by the cryptography-based storage application associated with the target address. Furthermore, the system may determine, using the cryptographic token, one or more parameters for accessing the first user data. In response to verifying the one or more parameters, access to the first user data may be enabled.

The above-described mechanism may perform the following operations to enable access to user data. This mechanism may be described in terms of a data sharing system. The data sharing system may receive a request to share some information. In particular, the data sharing system may receive, from a first device associated with a first cryptography-based storage application, a first blockchain operation request for enabling access to first user data associated with the first cryptography-based storage application. The first blockchain operation request may include a target address associated with a second cryptography-based storage application. That is, the data sharing system may receive data/parameters for creating a cryptographic token (e.g., non-fungible token) for enabling access to data.

The data sharing system may then generate a cryptographic token based on the received blockchain operation request. For example, the data sharing system may generate, using an on-chain program (e.g., a program deployed on a blockchain), a cryptographic token, such as a non-fungible token. Furthermore, the on-chain program may insert the target address and an access entry into the cryptographic token. The target address may indicate control of the cryptographic token by the second cryptography-based storage application associated with the target address. For example, the cryptographic token may be generated to be controlled by a cryptography-based storage application associated with a second user. The access entry may indicate the first user data and one or more parameters for accessing the first user data.

In some embodiments, the data sharing system may use encryption to further secure that data. In particular, before inserting the access entry into the cryptographic token, the data sharing system may cause the on-chain program to retrieve a public key associated with the second cryptography-based storage application and encrypt, using the public key associated with the second cryptography-based storage application, the one or more parameters into an encrypted parameter set.

In some embodiments, the data sharing system may receive a request from a second user to access the encrypted data. For example, the system may receive, from a second device associated with the second cryptography-based storage application, a second blockchain operation request for accessing the first user data. The second blockchain operation request may include an address associated with the non-fungible token and a cryptographic signature associated with the second cryptography-based storage application. In one example, a second user associated with cryptography-based storage application, such as an employer, may request access to a subset of healthcare data, such as vaccination records, of the user.

When the request is received, the data sharing system may verify that the second user is allowed to access the encrypted data. For example, in response to the second blockchain operation request, the data sharing system may determine, using the cryptographic signature and the address associated with the non-fungible token, that the second cryptography-based storage application controls the non-fungible token.

The system may determine, from the data, the access parameters that limit the second user's access to the user data (e.g., time parameters, location parameters, etc.). In particular, the system may determine, based on the access entry within the non-fungible token, the one or more parameters for accessing the first user data by transmitting a request to the second device for decrypting the one or more parameters. The request may include the encrypted parameter set and/or other data. In response to the request, the system may receive, from the second device, the one or more parameters decrypted by the second device.

Using the access parameters, the data sharing system may verify whether the request for data is valid (e.g., within a designated time frame, within a designated location, etc.). In some embodiments, the data sharing system may verify the one or more parameters by comparing a first parameter of the one or more parameters with metadata associated with the second blockchain operation request and verifying the first parameter based on the first parameter matching the metadata associated with the second blockchain operation request. In some embodiments, verifying may include determining, based on a second parameter of the one or more parameters, the first user data. The first user data may be a subset of data associated with the first user. For example, a first user may have data indicating all the medical history associated with the first user. The first user may wish to enable access to only a subset of the medical history data, such as vaccination status and records, by another user, such as an employer. The first user may not desire to enable access to other data, such as illnesses that carry social stigma or other personal details about family planning and/or mental health, for example, that may be associated with the first user.

In response to verification, the data sharing system may enable access to the first user data. For example, the data sharing system may enable access to the first user data by transmitting a resource identifier, such as a uniform resource identifier (URI), or by transmitting an encrypted resource identifier. In some embodiments, enabling access to the first user data includes transmitting, to the second device, a resource identifier comprising a reference to the first user data. For example, the resource identifier may be a link or password. In some embodiments, enabling access to the first user data includes encrypting a resource identifier for accessing the first user data using a public key associated with the second cryptography-based storage application into an encrypted resource identifier; and transmitting the encrypted resource identifier to the second device. The second device may be enabled to decrypt the encrypted resource identifier using a private key associated with the second cryptography-based storage application.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
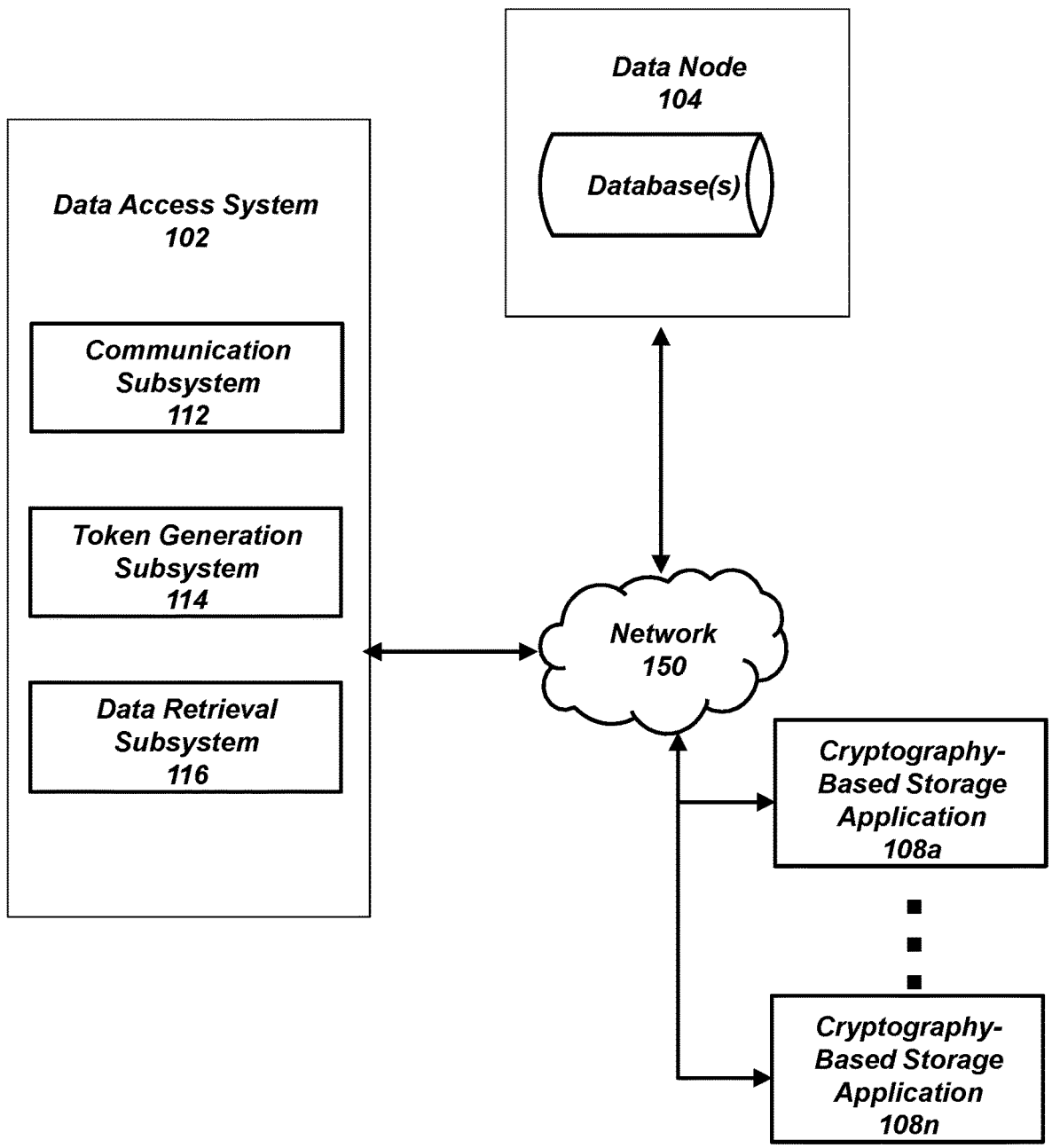
FIG. 1 shows an illustrative system for enabling users to access user data of other users using generated non-fungible tokens that store access parameters, in accordance with one or more embodiments of this disclosure.

FIG. 1 is an example of environment 100 for enabling users to access user data of other users using generated non-fungible tokens that store access parameters. Environment 100 includes data access system 102, data node 104, and cryptography-based storage applications 108a-108n. Data access system 102 may execute instructions for enabling users to access user data of other users using generated non-fungible tokens that store access parameters. Data access system 102 may include software, hardware, or a combination of the two. For example, data access system 102 may be hosted on a physical server or a virtual server that is running on a physical computer system. In some embodiments, data access system 102 may be configured on a user device (e.g., a laptop computer, a smartphone, a desktop computer, an electronic tablet, or another suitable user device). For example, data access system 102 may be stored on a blockchain and may execute operations on a blockchain node, such as a computer or processor. For example, the cryptography-based storage applications 108a-108n may be wallets (e.g., digital wallets) and the operations the node may execute may be part of one or more on-chain programs, such as smart contracts. Each cryptography-based storage application may store one or more keys that enable the corresponding cryptography-based storage application to sign blockchain operation requests, thereby proving ownership/control of a particular cryptographic token (e.g., a non-fungible token) on a computer or another suitable user device (e.g., a smartphone, electronic tablet, etc.). A cryptographic token may be a token storing digital information (e.g., health data, a link to the health data, etc.). A cryptographic token may be written to a blockchain (e.g., minted on a blockchain) via a blockchain operation performed by a blockchain node.

Data node 104 may store various data, including user data, copies of on-chain programs, and/or other suitable data. Data node 104 may include software, hardware, or a combination of the two. For example, data node 104 may be a physical server, or a virtual server that is running on a physical computer system. In some embodiments, data access system 102 and data node 104 may reside on the same hardware and/or the same virtual server/computing device. Network 150 may be a local area network, a wide area network (e.g., the Internet), or a combination of the two.

Cryptography-based storage applications 108a-108n may include software, hardware, or a combination of the two. For example, each cryptography-based storage application may include software executed on one or multiple devices or may include hardware such as a physical device. In some cases, the cryptography-based storage application may be software and may be stored in data nodes, and a user of the cryptography-based storage application may access the cryptography-based storage application online, e.g., via a browser. Alternatively or additionally, the cryptography-based storage application may reside on a general-purpose computer or on a special device (e.g., a fob) intended for storing the cryptography-based storage application. For example, the device may store private keys in a memory of the device and allow transactions to be completed on the device itself. Examples of cryptography-based storage applications may include cryptographic wallets. Devices may include any suitable end-user computing devices (e.g., desktop computers, laptops, electronic tablets, smartphones, and/or other computing devices used by end users) capable of transmitting and receiving data such as requests and/or like transactions.

Data access system 102 may receive requests to enable access to user data and/or requests for accessing user data. In some embodiments, data access system 102 may receive the requests using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive one or more requests to enable access to user data and/or one or more requests for accessing user data from one of cryptography-based storage applications 108a-108n. For example, a first user associated with cryptography-based storage application 108a may have data that the user does not wish to share publicly. For example, the data may be healthcare data. The user may wish to share the data only with one or two other people or entities, such as a hospital or a doctor. In order to do so, the first user may request to enable access to the first user's data (e.g., health records, etc.) by a second user, such as a doctor, associated with cryptography-based storage application 108n. Communication subsystem 112 may pass at least a portion of the data included in the request to enable access to the first user data, or a pointer to the data in memory, to token generation sub system 114.

Token generation subsystem 114 may include software components, hardware components, or a combination of both. For example, token generation subsystem 114 may include software components (e.g., API calls) that access and/or execute programs such as on-chain programs to generate tokens (e.g., cryptographic tokens). Token generation subsystem 114 may access the data included in the request to enable access to the first user data, for example, in memory. In some embodiments, the request data may include an identifier for an on-chain program for generating a token for enabling access, the target address associated with the second cryptography-based storage application, and/or the like. An on-chain program may be a computer program or any suitable code for performing computing operations stored on a blockchain. In some cases, the on-chain program may run when predetermined conditions are satisfied. In one example, the on-chain program may be a smart contract deployed on a blockchain. The smart contract may be retrieved and executed by a blockchain node. Components of the request for enabling access to the user data are described further herein with reference to FIG. 2.

Figure 2:
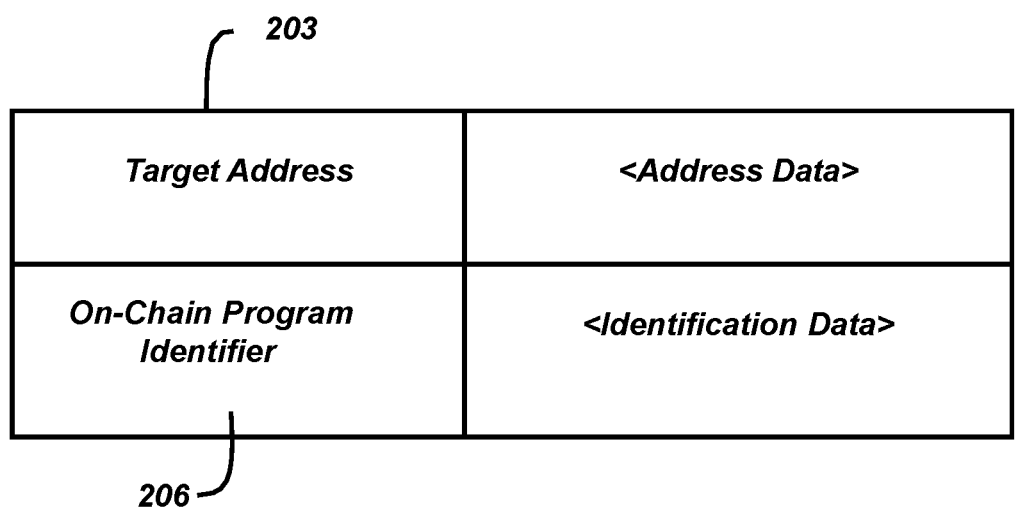
FIG. 2 illustrates a data structure for a request for enabling access to user data, in accordance with one or more embodiments of this disclosure.

FIG. 2 illustrates an exemplary data structure 200 for a request for enabling access to user data (e.g., a request to mint a cryptographic token). Data structure 200 may include target address 203 and on-chain program identifier 206. As described herein, data access system 102 may receive a request, e.g., from a first user at a first device and/or a first cryptography-based storage application via communication subsystem 112. The request may include data for fields 203 and 206. Furthermore, the request may include an instruction to generate (e.g., mint) the cryptographic token.

Target address 203 may be an identifier such as an address of a second cryptography-based storage application. For example, where a first user associated with a first cryptography-based storage application (e.g., 108a) requests to enable access to the first user's data (e.g., health records, etc.) by a second user (e.g., employer, etc.) associated with a second cryptography-based storage application (e.g., 108n), target address 203 may indicate the address of the second cryptography-based storage application. In some examples, target address 203 may be a string of alphanumeric characters. For example, the target address may be a string of 32 alphanumeric characters and may identify what is sometimes referred to as a cryptographic wallet. Some examples of hardware cryptographic wallets include Ledger® and Trezor®. Software cryptographic wallets may include MetaMask® and others.

On-chain program identifier 206 may be an identifier for an on-chain program that may be executed using a blockchain node. Token generation subsystem 114 may instruct the blockchain node to execute the on-chain program (e.g., to mint the cryptographic token). For example, the on-chain program identifier may be an address, such as a string of alphanumeric characters. The address may be a reference to code or a program to be executed by a blockchain node (e.g., via a blockchain operation). The blockchain operation may be triggered by data access system 102. As referenced herein, a blockchain operation may refer to an operation that causes data to be recorded onto the blockchain (e.g., within a blockchain block) or an operation that causes data to be read from the blockchain. For example, a blockchain operation may be a transfer of control for one or more cryptographic tokens from one cryptography-based storage application to another. Another example of a blockchain operation may be a request for data from a blockchain node (e.g., a reading operation). A blockchain transaction request may be a request to a server that instructs the server to cause a blockchain operation. In another example, a blockchain operation may cause an on-chain program to generate one or more cryptographic tokens.

In some examples, the on-chain program referenced by the on-chain program identifier may also specify one or more parameters for accessing the first user data. For example, the on-chain program may specify at what times and/or locations the second user may be enabled to access the first user data. In some examples, the on-chain program may specify what institutions are allowed to access the first user data. In yet other examples, the timing parameters may indicate an expiration date/time of the access and/or a start date/time of the access.

In some examples, communication subsystem 112, when receiving the request, may pass target address 203 and/or on-chain program identifier 206 to token generation subsystem 114. Additionally or alternatively, communication subsystem 112 may store the target address and/or on-chain program identifier in memory and pass a pointer to the data in memory to token generation sub system 114.

As described in detail with reference to FIG. 1, the on-chain program referenced by on-chain program identifier 206 may be called and executed to generate a cryptographic token. In some examples, token generation subsystem 114 may insert the target address into the cryptographic token as part of generating the cryptographic token for enabling access by the second user. As described herein, the token generation subsystem may generate an access entry indicating the one or more parameters and may insert the access entry into the cryptographic token as part of token generation.

Referring to FIG. 1, token generation subsystem 114 may also generate an access entry for the token. The access entry may indicate the first user data and one or more parameters for accessing the first user data. Thus, token generation subsystem 114 may generate a token using the on-chain program indicated by the identifier in the request data. For example, the token generation subsystem may generate a blockchain operation for a blockchain node that may call and execute the on-chain program to generate the cryptographic token. As part of the generation process, the on-chain program may insert the target address and the access entry into the cryptographic token when executed. The generated token may also be generated to be controlled by the target address associated with the second cryptography-based storage application (e.g., a cryptography-based storage application associated with a user or entity that should have access to the first user data). The on-chain program may commit the cryptographic token (e.g., mint the cryptographic token) to the blockchain via a blockchain operation.

When the cryptographic token has been generated, communication subsystem 112 may transmit one or more notifications to the users. For example, communication subsystem 112 may transmit a message (e.g., email, text, etc.) to a device of the first user and/or second user to notify them that the first user data is now available to be requested by the second user.

Communication subsystem 112 may also receive requests for accessing the first user data, such as from a second cryptography-based storage application. For example, a second user associated with a second cryptography-based storage application (e.g., 108n) may request to access the first user's data (e.g., health records, etc.) associated with a first cryptography-based storage application (e.g., 108a). In some examples, the request for accessing the first user data may be transmitted by the second device automatically. For example, the second device may transmit the request in response to receiving a notification by communication subsystem 112, e.g., that the first user data is available to be requested. Communication subsystem 112 may pass at least a portion of the data included in the request to access the first user data, or a pointer to the data in memory, to data retrieval subsystem 116. The request to access the first user data is described further herein with reference to FIG. 3.

Figure 3:
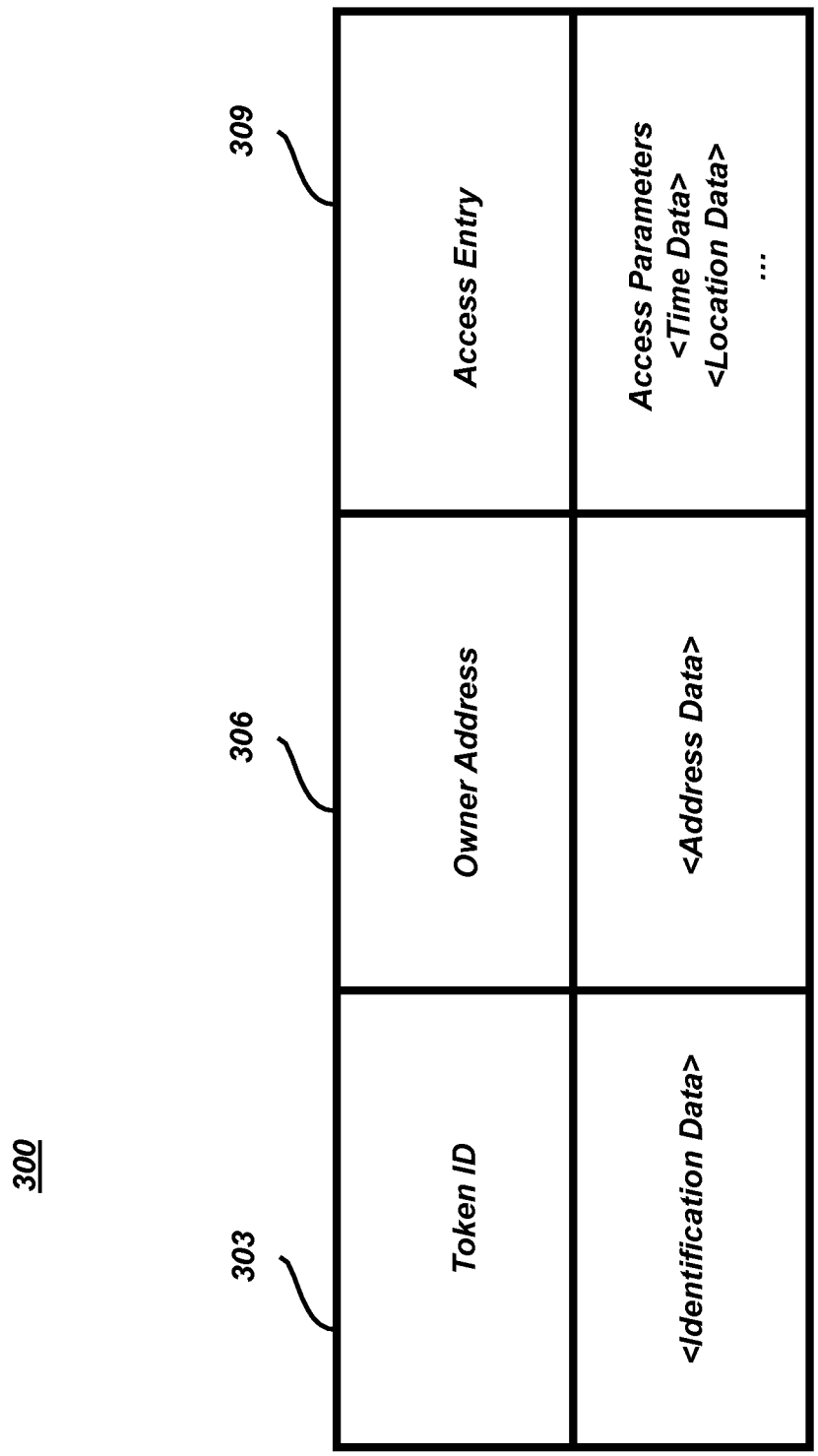
FIG. 3 illustrates a data structure representing a cryptographic token, in accordance with one or more embodiments of this disclosure.

FIG. 3 illustrates a data structure 300 representing a cryptographic token generated by token generation subsystem 114. Data structure 300 may include token identifier 303, owner address 306, and access entry 309. Token identifier 303 may be an identifier for the cryptographic token. Token identifier 303 may have a value such as an unsigned integer value from 8 bits to 256 bits. In some embodiments, the term owner address refers to an address associated with a cryptography-based storage application that is able to transfer the cryptographic token by signing a blockchain operation (e.g., a blockchain transaction) with a private key associated with the cryptography-based storage application.

Owner address 306 may have a value identifying the owner of the token. As described herein, token generation subsystem 114 inserts the target address into the cryptographic token such that owner address 306 of the generated cryptographic token contains the target address to a second cryptography-based storage application (e.g., a string of alphanumeric characters, a wallet address, etc.).

As described herein, token generation subsystem 114 may also generate and insert access entry 309 into the cryptographic token. The access entry may include one or more parameters that enable access to the first user data. For example, the one or more parameters may specify conditions under which the second user may access the first user data via the second cryptography-based storage application. Some examples of parameters include time-based parameters, such as time limits as to when a second user can access the first user data. For example, the first user may enable the second user to access the first user data only during weekdays, or during certain times of day, such as from 8:00 a.m. to 5:00 p.m. In another example, a time parameter may be an expiration time after which the first user data may not be accessed. Some parameters may include location-based parameters, such as enabling access only in certain areas, or restricting access in certain areas. For example, the first user may enable access to the first user data only in certain countries or states. In another example, a location parameter may indicate that only Internet Protocol (IP) addresses from a particular entity (e.g., a particular hospital or doctor's office) may be allowed access. Other examples of parameters may include institution-based parameters, such that the first user enables only certain institutions to access the data. In some examples, the parameters may be encrypted (e.g., using the public key associated with the second cryptography-based storage application). The encrypted parameters may form an encrypted parameter set.

The access entry may also indicate the user data for which a first user is requesting to enable access. In some embodiments, the access entry may include a resource identifier such as a uniform resource identifier (URI). The resource identifier may include a reference to the first user data (e.g., a link, a pointer, for example, to a data node, and/or the like). In some examples, the resource identifier may be encrypted (e.g., an encrypted URI). In some examples, the access entry may be partially or wholly included in metadata such as private metadata including embedded secret links and/or pointers to the first user data itself or to a location storing the first user data. In some examples, the resource identifier may include a reference to a location on a third-party platform (e.g., website, application, etc.) allowing access to the user data. In some examples, the on-chain program may be configured to transmit the access entry in response to verifying the access parameters.

According to some embodiments, the resource identifier for accessing first user data may be encrypted. For example, the resource identifier could be encrypted using a public key associated with the cryptography-based storage application of the second user (e.g., the user that will be accessing the first user data). On receiving the resource identifier, e.g., from data access system 102, the user seeking access to the user data (e.g., the second user) may decrypt the encrypted resource identifier, for example, by using a private key associated with the second cryptography-based storage application.

When a cryptographic token is generated by token generation subsystem 114, communication subsystem 112 may transmit one or more notifications to the users. For example, communication subsystem 112 may transmit a message (e.g., email, text, etc.) to a device of the first user and/or second user to notify them that the first user data is now available to be requested by the second user. The message may include a link to the second user's cryptography-based storage application or a link to open an application storing the second user's cryptography-based storage application so that the second user may subsequently request access.

Referring to FIG. 1, data retrieval subsystem 116 may access at least a portion of data included in the request to access the first user data, for example, in memory. The request to access the first user data may include an identifier of the cryptographic token (e.g., a token ID) which may be used to retrieve the cryptographic token data. Using the cryptographic token, data retrieval subsystem 116 may be configured to determine parameters for accessing the first user data. For example, data retrieval subsystem 116 may transmit a request to the second device for decrypting the one or more parameters, wherein the request comprises the encrypted parameter set. Data retrieval subsystem 116 may then receive, from the second device, the one or more parameters.

Data retrieval subsystem 116 may also enable access to the first user data in response to verifying the one or more parameters. For example, data retrieval subsystem 116 may compare parameters with metadata associated with the request to access the user data. If the parameters match the metadata, data retrieval subsystem 116 may enable access by transmitting a resource identifier. As referenced herein, parameters may specify conditions under which a user may access the first user data. Some examples of parameters include time-based parameters, location-based parameters, institution-based parameters, and/or the like.

In one example, data retrieval subsystem 116 may also encrypt a resource identifier for accessing the first user data using a public key associated with the second cryptography-based storage application (e.g., 108*n*) into an encrypted resource identifier and transmit the encrypted resource identifier to the second device. The second device is enabled to decrypt the encrypted resource identifier using a private key associated with the second cryptography-based storage application.

Figure 4:
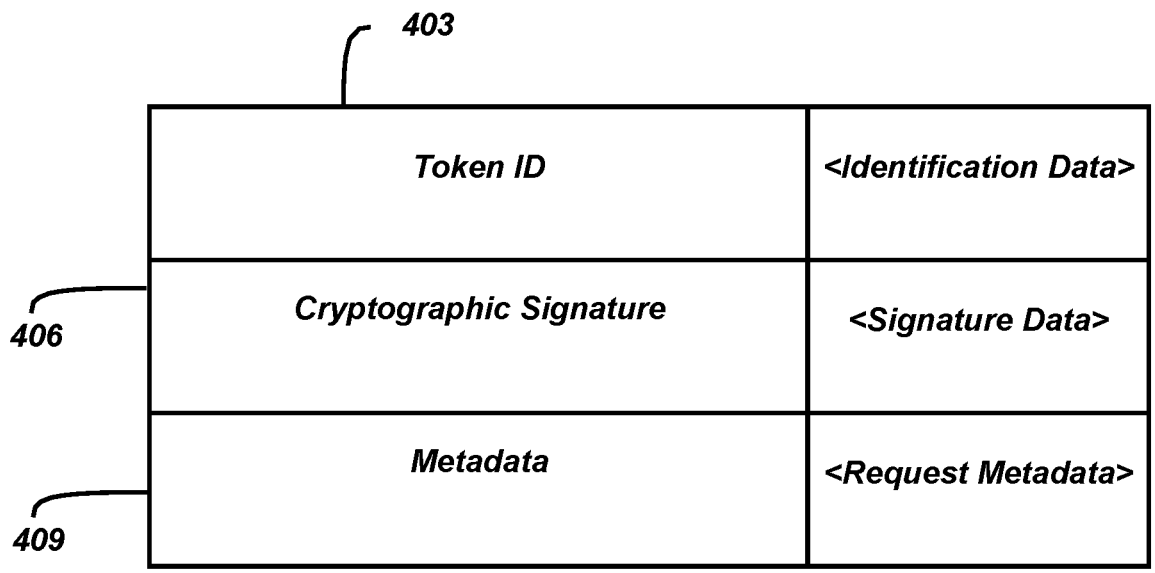
FIG. 4 illustrates a data structure for a request for accessing the user data, in accordance with one or more embodiments of this disclosure.

Communication subsystem 112 may receive a request to access the user data from a device or cryptography-based storage application (e.g., 108*n*) attempting to access the user data. For example, a doctor or hospital entity may transmit a request to access the medical records of a patient. FIG. 4 illustrates an exemplary data structure 400 for a request for accessing the user data, in accordance with one or more embodiments of this disclosure. Data structure 400 for a request for access may include token identifier 403, cryptographic signature 406, and metadata 409. Token identifier 403 may store data identifying a token, such as a cryptographic token (e.g., non-fungible token). Data access system 102 may use token identifier 403 to retrieve at least part of the generated cryptographic token. For example, data access system 102 may retrieve the address of the owner of the cryptographic token, e.g., to verify that the second user (e.g., hospital, doctor) who should be enabled to have access is the same as the user requesting access.

For example, data access system 102 may retrieve the address of the owner of the cryptographic token (e.g., the cryptography-based storage application to which the first user is requesting to enable access) from the cryptographic token using token identifier 403. Data access system 102 may also retrieve the address of the source of the request. For example, the address may be retrieved from the request to access the first user data, such as in metadata of a blockchain operation request. Data access system 102 may then compare the owner address (e.g., owner address 306 of data structure 300) to the address of the source of the request. If the owner address of the cryptographic token is equivalent to the sender address from which the request to access originated, data access system 102 determines that the cryptography-based storage application associated with the sender address controls the cryptographic token and may subsequently verify parameters for accessing the data and/or enable access to the data.

In some embodiments, the request for accessing user data may be a blockchain operation request and may use blockchain operation functionality. In some examples, a blockchain operation request may include a request for a blockchain transaction (e.g., transfer of control of one or more cryptographic tokens from one cryptography-based storage application to another). Alternatively or additionally, a blockchain operation request may include any signal comprising data for performing a blockchain operation. For example, the blockchain operation request may include cryptographic signature 406 for verifying the sender of the request for accessing the user data. For example, blockchain nodes that participate in the blockchain network may use cryptographic signature 406 to authenticate that the request for access is from the sender of the request. In some examples, cryptographic signature 406 may be a digital signature. The sender of the request to access the data may generate a digital signature using a private key of a cryptography-based storage application corresponding to the sender. The digital signature may be verified by the data access system using the public key of the same cryptography-based storage application corresponding to the sender. As referenced herein, blockchain operation functionality may include any functionality specific to a blockchain, such as functionality for performing blockchain transactions (e.g., generating cryptographic tokens, transferring those tokens, etc.).

For example, a function (e.g., Rivest-Shamir-Adleman (RSA) function) may be applied to a message (or the hash of a message) with the private key of the second cryptography-based storage application belonging to the sender. The data access system, or any node of the blockchain, may verify that the request is indeed coming from the second cryptography-based storage application by applying a function with the public key to the digital signature and comparing the result to the expected message (or the hash of the message). If the expected message and/or hash is equivalent to the result of applying the function, then the data access system can verify that the request is coming from the cryptography-based storage application associated with the private and public keys. Any suitable functions and/or alternative digital signature schemes may be used, such as Probabilistic Signature Scheme (PSS) and/or the like.

As described above, the request for accessing data may include metadata 409. Metadata 409 may include data regarding the request for accessing the data. For example, the metadata may include data such as when the request was made, the Internet Protocol (IP) address where the request was made, etc. The request metadata may be used, e.g., by data retrieval subsystem 116 to verify the access parameters. For example, data access system 102 may compare the access parameters in the cryptographic token identified by token identifier 403 and parts of the metadata 409 of the request to access. In one particular example, the data access system may determine from metadata 409 that the request to access the data was made at 4:30 p.m. and determine that it falls within the times specified in the access parameters. In some embodiments, data access system 102 may use the IP address to determine the location of the second device and compare that location with allowed locations to determine whether access to the first user data should be enabled.

Figure 5:
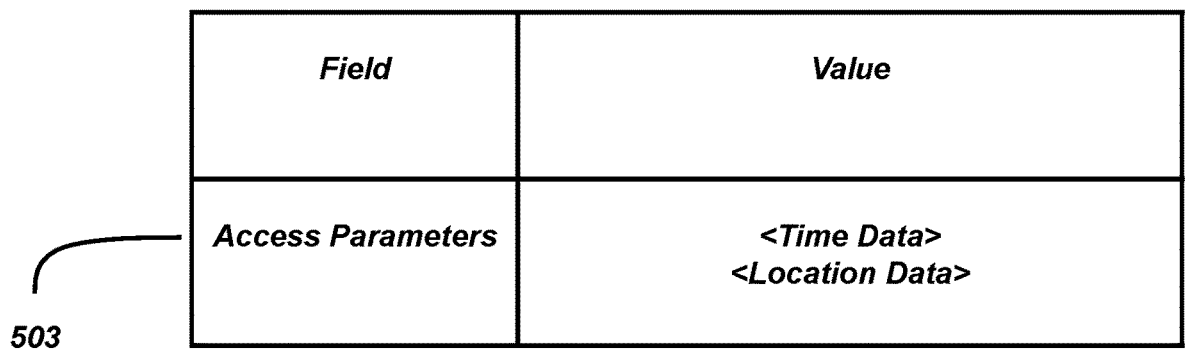
FIG. 5 illustrates a table of exemplary decrypted data used for accessing the user data, in accordance with one or more embodiments of this disclosure.

In an alternative or additional example, the access parameters may be encrypted. In response to receiving the request to access the first user data from the second device, data access system 102 may transmit a request to the second device for decrypting the encrypted parameters. Data access system 102 may determine an address associated with the second device based on the second blockchain operation request (e.g., based on an Internet Protocol (IP) address stored within the first blockchain operation request). The encrypted parameters may have been encrypted using the public key of the second cryptography-based storage application. The second device may decrypt the transmitted encrypted parameters using the private key of the second cryptography-based storage application and transmit the decrypted parameters to data access system 102. For example, FIG. 5 illustrates a table 500 of exemplary decrypted data used for accessing the user data, which includes access parameters 503 such as time-based and location-based parameters. Data access system 102 may then compare the access parameters and parts of the metadata 409 of the request to access.

In response to verifying that the conditions specified by the one or more parameters are met (e.g., the conditions under which the second user may access the first user data via the second cryptography-based storage application are met), data access system 102 may enable access to the first user data. For example, the data access system may transmit a resource identifier as described herein, such as a uniform resource identifier (URI). In other embodiments, the data access system may transmit an encrypted resource identifier, such as an encrypted URI. As described herein, the resource identifier may be encrypted using a public key of the second user. For example, an RSA function (and/or the like) may be applied to the resource identifier with the private key of the second cryptography-based storage application belonging to the sender. The second user may decrypt the resource identifier using a private key of the cryptography-based storage application associated with the second user. In some examples, an on-chain program (e.g., the on-chain program described herein) may be configured to transmit the user data to the second device automatically. In another example, the on-chain program may automatically transmit a resource identifier (e.g., a URI, an encrypted resource identifier, and/or an encrypted URI, etc.).

In some embodiments, the first user may own a first cryptographic token (e.g., non-fungible token) indicating the first user's access rights to the first user data and data access system 102. Additionally or alternatively, the on-chain program may require the first user to sign a transaction using a private key of a cryptography-based storage application (e.g., digital wallet) associated with the first user (e.g., to prove that the first user is the owner of the first cryptographic token) in order to create the cryptographic token described above (e.g., a cryptographic token as described in reference to FIG. 3) for enabling access to the first user data by the second user.

In further embodiments, owners of the generated cryptographic tokens, such as the second users who are enabled access to the first user data (e.g., the second user), may use the cryptographic token and corresponding on-chain program to generate a second cryptographic token having the same data structure as described with respect to FIG. 3. The second cryptographic token may be used to enable access to at least part of the first user's data by a third user through the second user. For example, a first user may be a patient whose data includes medical records. The first user may enable access to the medical records by a second user, for example, a hospital or doctor, using a cryptographic token as described herein. Subsequently, the hospital or doctor may provide the medical data to a third user, such as an employer or school. In a further example, the hospital or doctor may provide only a subset of the first user data, such as vaccination records, to the employer or school. Additionally or alternatively, the second user may transfer ownership of the cryptographic token to another user (e.g., via a blockchain transaction).

Computing Environment

Figure 6:
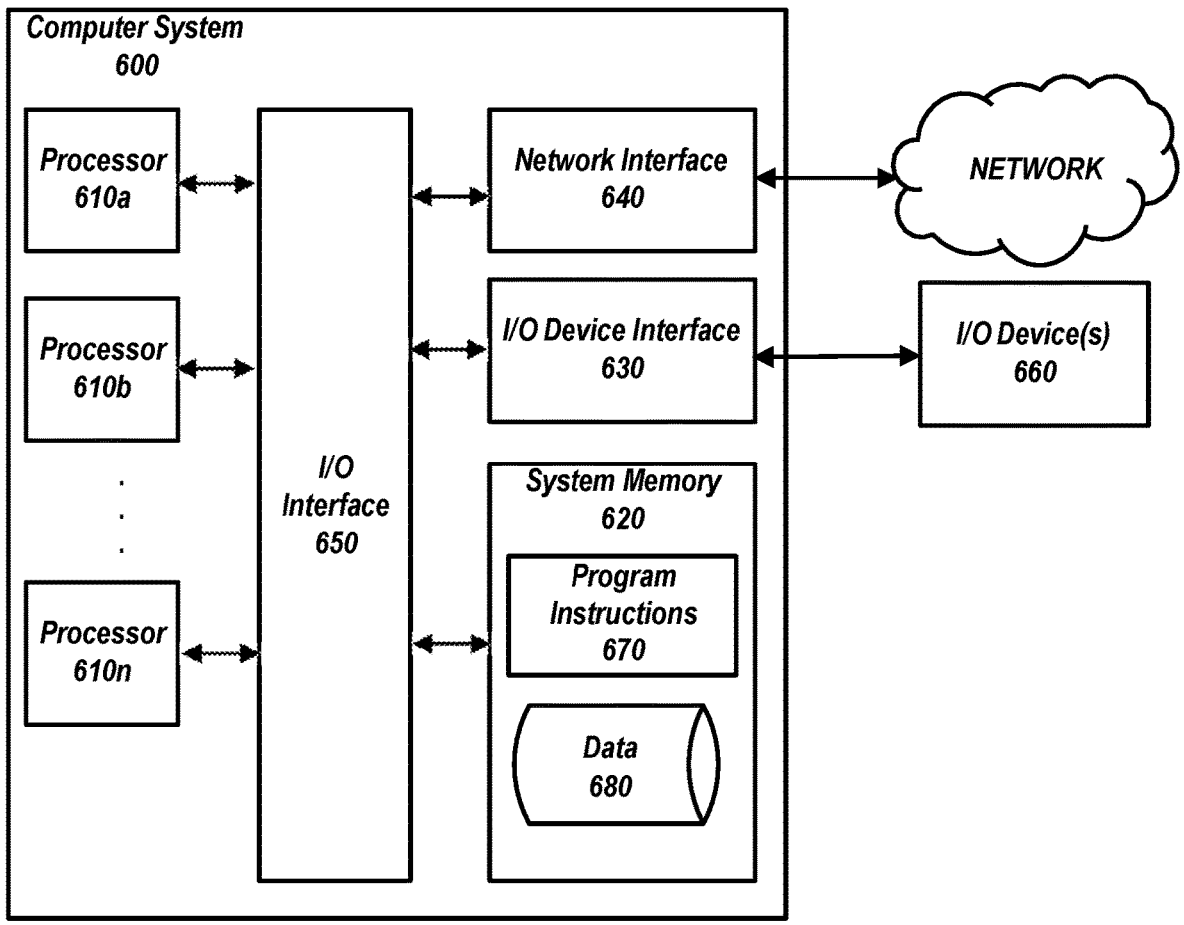
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
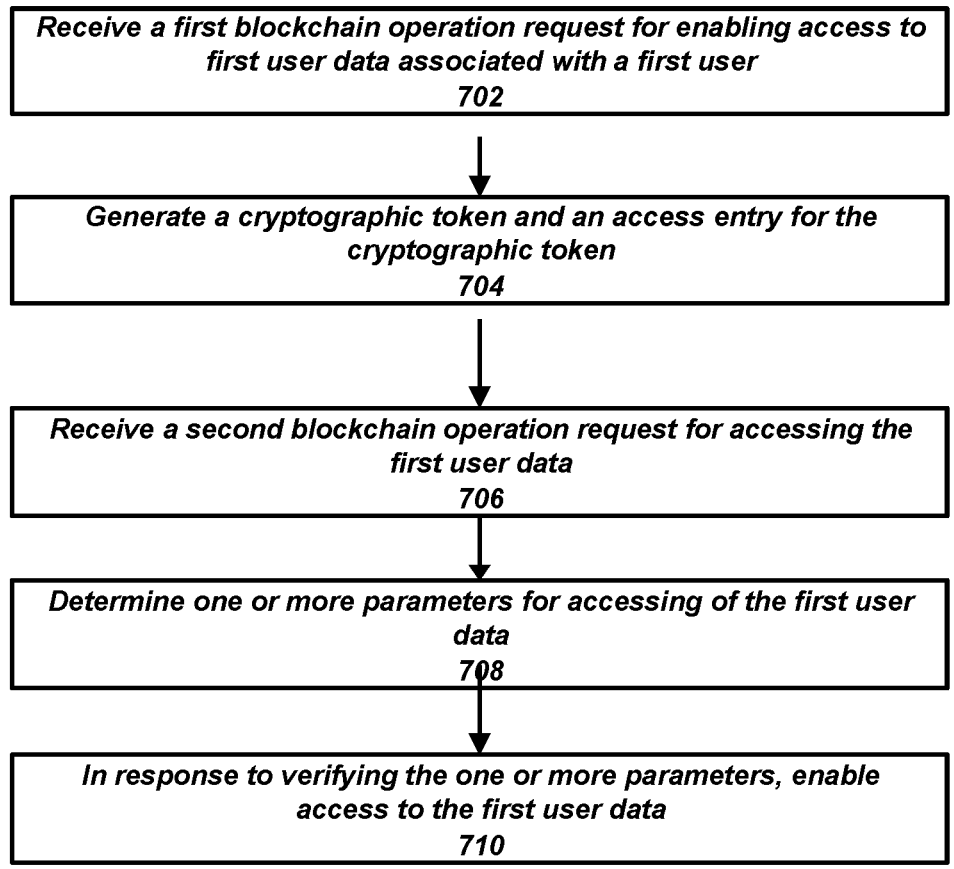
FIG. 7 is a flowchart of operations for enabling users to access user data of other users using generated non-fungible tokens that store access parameters, in accordance with one or more embodiments of this disclosure.

FIG. 7 is a flowchart 700 of operations for enabling users to access user data of other users using generated non-fungible tokens that store access parameters. The operations of FIG. 7 may use components described in relation to FIG. 6. In some embodiments, data access system 102 may include one or more components of computer system 600. At 702, data access system 102 may receive a first blockchain operation request for enabling access to first user data associated with a first user. For example, data access system 102 may receive the first blockchain operation request from a first device associated with a first cryptography-based storage application, such as cryptography-based storage applications 108a-108n. Data access system 102 may receive the first blockchain request over network 150.

At 704, data access system 102 may generate a cryptographic token, such as described in reference to FIG. 3, and an access entry for the cryptographic token. For example, the cryptographic token may be generated to be controlled by a second cryptography-based storage application (e.g., any of 108a-108n) associated with a second user, and the access entry may indicate the first user data and one or more parameters for accessing the first user data. In some examples, generating the access entry for the cryptographic token may include inserting the access entry into the cryptographic token. Inserting the access entry into the cryptographic token may include retrieving a public key associated with the second cryptography-based storage application and encrypting, using the public key associated with the second cryptography-based storage application, the one or more parameters into an encrypted parameter set. In some examples, the request includes a target address associated with a second cryptography-based storage application. Data access system 102 may use one or more processors 610a, 610b, and/or 610n to perform the generation.

At 706, data access system 102 may receive a second blockchain operation request for accessing the first user data. For example, data access system 102 may receive the second blockchain operation request from a second device associated with the second cryptography-based storage application. In some examples, the second blockchain operation request may include an address associated with the cryptographic token and a cryptographic signature associated with the second cryptography-based storage application.

At 708, data access system 102 may determine one or more parameters for accessing the first user data. In some examples, determining the one or more parameters includes data access system 102 transmitting a request to the second device (e.g., a device hosting a cryptography-based storage application such as any of 108a-108n) for decrypting the one or more parameters, wherein the request comprises the encrypted parameter set and receiving, from the second device, the one or more parameters. Data access system 102 may use one or more processors 610a, 610b, and/or 610n to perform the determination.

At 710, data access system 102 may enable access to the first user data in response to verifying the one or more parameters. In some examples, enabling access to the first user data includes transmitting, to the second device, a resource identifier comprising a reference to the first user data. In some examples, enabling access may include encrypting a resource identifier for accessing the first user data using a public key associated with the second cryptography-based storage application into an encrypted resource identifier and transmitting the encrypted resource identifier to the second device, wherein the second device is enabled to decrypt the encrypted resource identifier using a private key associated with the second cryptography-based storage application.

In some examples, verifying the one or more parameters includes comparing a first parameter of the one or more parameters with metadata associated with the second blockchain operation request, verifying the first parameter based on the first parameter matching the metadata associated with the second blockchain operation request, and determining, based on a second parameter of the one or more parameters, the first user data, wherein the first user data is a subset of data associated with the first user. Data access system 102 may use one or more processors 610a, 610b, and/or 610n to perform enabling.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for enabling users to access user data of other users using cryptographic tokens, the method comprising: receiving, from a first device associated with a first cryptography-based storage application, a first blockchain operation request for enabling access to first user data associated with a first user; generating, using an on-chain program, a cryptographic token and an access entry for the cryptographic token, wherein the cryptographic token is generated to be controlled by a second cryptography-based storage application associated with a second user, and wherein the access entry indicates the first user data and one or more parameters for accessing the first user data; receiving, from a second device associated with the second cryptography-based storage application, a second blockchain operation request for accessing the first user data; determining, based on the access entry associated with the cryptographic token, the one or more parameters for accessing the first user data; and in response to verifying the one or more parameters, enabling access to the first user data.
2. The method of the preceding embodiment, wherein enabling access to the first user data comprises transmitting, to the second device, a resource identifier comprising a reference to the first user data.
3. Any of the preceding embodiments, wherein enabling access to the first user data comprises: encrypting a resource identifier for accessing the first user data using a public key associated with the second cryptography-based storage application into an encrypted resource identifier; and transmitting the encrypted resource identifier to the second device, wherein the second device is enabled to decrypt the encrypted resource identifier using a private key associated with the second cryptography-based storage application.
4. Any of the preceding embodiments, wherein generating the access entry for the cryptographic token comprises inserting the access entry into the cryptographic token.
5. Any of the preceding embodiments, wherein inserting the access entry into the cryptographic token comprises: retrieving a public key associated with the second cryptography-based storage application; and encrypting, using the public key associated with the second cryptography-based storage application, the one or more parameters into an encrypted parameter set.

6. Any of the preceding embodiments, wherein determining the one or more parameters for enabling access to the first user data comprises: transmitting a request to the second device for decrypting the one or more parameters, wherein the request comprises the encrypted parameter set; and receiving, from the second device, the one or more parameters.

7. Any of the preceding embodiments, wherein the first blockchain operation request comprises a target address associated with a second cryptography-based storage application and the second blockchain operation request comprises an address associated with the cryptographic token and a cryptographic signature associated with the second cryptography-based storage application.

8. Any of the preceding embodiments, wherein verifying the one or more parameters comprises: comparing a first parameter of the one or more parameters with metadata associated with the second blockchain operation request; verifying the first parameter based on the first parameter matching the metadata associated with the second blockchain operation request; and determining, based on a second parameter of the one or more parameters, the first user data, wherein the first user data is a subset of data associated with the first user.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the one or more processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for enabling users to access user data of other users using generated non-fungible tokens that store access parameters, the system comprising:
  one or more processors; and
  a non-transitory, computer-readable storage medium storing instructions that when executed by the one or more processors cause the one or more processors to perform operations comprising:
    receiving, from a first device associated with a first cryptography-based storage application, a first blockchain operation request for enabling access to first user data associated with the first cryptography-based storage application, wherein the first blockchain operation request comprises a target address associated with a second cryptography-based storage application;
    generating, using an on-chain program, a non-fungible token, wherein the on-chain program inserts the target address and an access entry into the non-fungible token, wherein the target address indicates control of the non-fungible token and wherein the access entry indicates the first user data and one or more parameters for accessing the first user data;
    receiving, from a second device associated with the second cryptography-based storage application, a second blockchain operation request for accessing the first user data, wherein the second blockchain operation request comprises an address associated with the non-fungible token and a cryptographic signature associated with the second cryptography-based storage application;
    in response to the second blockchain operation request, determining, using the cryptographic signature and the address associated with the non-fungible token, that the second cryptography-based storage application controls the non-fungible token;
    determining, based on the access entry within the non-fungible token, the one or more parameters for accessing the first user data; and
    in response to verifying the one or more parameters, enabling access to the first user data.

2. The system of claim 1, wherein the instructions for enabling access to the first user data cause the one or more processors to transmit, to the second device, a resource identifier comprising a reference to the first user data.

3. The system of claim 1, wherein the instructions for enabling access to the first user data cause the one or more processors to perform operations comprising:
  encrypting a resource identifier for accessing the first user data using a public key associated with the second cryptography-based storage application into an encrypted resource identifier; and
  transmitting the encrypted resource identifier to the second device, wherein the second device is enabled to decrypt the encrypted resource identifier using a private key associated with the second cryptography-based storage application.

4. The system of claim 1, wherein the instructions for inserting the access entry into the non-fungible token further cause the one or more processors to perform operations comprising:
  retrieving a public key associated with the second cryptography-based storage application; and
  encrypting, using the public key associated with the second cryptography-based storage application, the one or more parameters into an encrypted parameter set.

5. A method for enabling users to access user data of other users using cryptographic tokens, the method comprising:
  receiving, from a first device associated with a first cryptography-based storage application, a first blockchain operation request for enabling access to first user data associated with a first user;
  generating, using an on-chain program, a cryptographic token and an access entry for the cryptographic token, wherein the cryptographic token is generated to be controlled by a second cryptography-based storage application associated with a second user, and wherein the access entry indicates the first user data and one or more parameters for accessing the first user data;
  receiving, from a second device associated with the second cryptography-based storage application, a second blockchain operation request for accessing the first user data;
  determining, based on the access entry associated with the cryptographic token, the one or more parameters for accessing the first user data; and
  in response to verifying the one or more parameters, enabling access to the first user data.

6. The method of claim 5, wherein enabling access to the first user data comprises transmitting, to the second device, a resource identifier comprising a reference to the first user data.

7. The method of claim 5, wherein enabling access to the first user data comprises:

encrypting a resource identifier for accessing the first user data using a public key associated with the second cryptography-based storage application into an encrypted resource identifier; and transmitting the encrypted resource identifier to the second device, wherein the second device is enabled to decrypt the encrypted resource identifier using a private key associated with the second cryptography-based storage application.

8. The method of claim 5, wherein generating the access entry for the cryptographic token comprises inserting the access entry into the cryptographic token.

9. The method of claim 8, wherein inserting the access entry into the cryptographic token comprises:

retrieving a public key associated with the second cryptography-based storage application; and encrypting, using the public key associated with the second cryptography-based storage application, the one or more parameters into an encrypted parameter set.

10. The method of claim 9, wherein determining the one or more parameters for enabling access to the first user data comprises:

transmitting a request to the second device for decrypting the one or more parameters, wherein the request comprises the encrypted parameter set; and receiving, from the second device, the one or more parameters.

11. The method of claim 5, wherein the first blockchain operation request comprises a target address associated with the second cryptography-based storage application and the second blockchain operation request comprises an address associated with the cryptographic token and a cryptographic signature associated with the second cryptography-based storage application.

12. The method of claim 5, wherein verifying the one or more parameters comprises:

comparing a first parameter of the one or more parameters with metadata associated with the second blockchain operation request;

verifying the first parameter based on the first parameter matching the metadata associated with the second blockchain operation request; and determining, based on a second parameter of the one or more parameters, the first user data, wherein the first user data is a subset of data associated with the first user.

13. A non-transitory, computer-readable medium storing instructions that when executed by one or more processors cause the one or more processors to perform operations comprising:

receiving, from a first device associated with a first cryptography-based storage application, a first blockchain operation request for enabling access to first user data associated with a first user by a second user associated with a second cryptography-based storage application;

generating, using an on-chain program, a cryptographic token and an access entry for the cryptographic token, wherein the access entry indicates the first user data and one or more parameters for accessing the first user data;

inserting, into the cryptographic token, an identifier associated with the second cryptography-based storage application and an indicator associated with the access entry, wherein the identifier indicates that the cryptographic token is controlled by the second cryptography-based storage application;

adding the cryptographic token to a blockchain; and transmitting a response to the first device indicating a successful blockchain operation.

14. The non-transitory, computer-readable medium of claim 13, wherein the instructions cause the one or more processors to perform operations comprising:

receiving, from a second device associated with the second cryptography-based storage application, a second blockchain operation request for accessing the first user data;

determining, based on the access entry associated with the cryptographic token, the one or more parameters for accessing the first user data; and in response to verifying the one or more parameters, enabling access to the first user data.

15. The non-transitory, computer-readable medium of claim 14, wherein the instructions for enabling access to the first user data cause the one or more processors to perform operations comprising:

encrypting a resource identifier for accessing the first user data using a public key associated with the second cryptography-based storage application into an encrypted resource identifier; and transmitting the encrypted resource identifier to the second device, wherein the second device is enabled to decrypt the encrypted resource identifier using a private key associated with the second cryptography-based storage application.

16. The non-transitory, computer-readable medium of claim 14, wherein the instructions for generating the access entry for the cryptographic token cause the one or more processors to insert the access entry into the cryptographic token.

17. The non-transitory, computer-readable medium of claim 16, wherein the instructions for inserting the access entry into the cryptographic token further cause the one or more processors to perform operations comprising:

retrieving a public key associated with the second cryptography-based storage application; and encrypting, using the public key associated with the second cryptography-based storage application, the one or more parameters into an encrypted parameter set.

18. The non-transitory, computer-readable medium of claim 17, wherein the instructions for determining the one or more parameters for enabling access to the first user data cause the one or more processors to perform operations comprising:

transmitting a request to the second device for decrypting the one or more parameters, wherein the request comprises the encrypted parameter set; and receiving, from the second device, the one or more parameters.

19. The non-transitory, computer-readable medium of claim 14, wherein the first blockchain operation request comprises a target address associated with the second cryptography-based storage application and the second blockchain operation request comprises an address associated with the cryptographic token and a cryptographic signature associated with the second cryptography-based storage application.

20. The non-transitory, computer-readable medium of claim 14, wherein the instructions for verifying the one or more parameters cause the one or more processors to perform operations comprising:

comparing a first parameter of the one or more parameters with metadata associated with the second blockchain operation request;

verifying the first parameter based on the first parameter matching the metadata associated with the second blockchain operation request; and determining, based on a second parameter of the one or more parameters, the first user data, wherein the first user data is a subset of data associated with the first user.

* * * * *